US012597290B2

(12) United States Patent
Haeberling et al.

(10) Patent No.: US 12,597,290 B2
(45) Date of Patent: Apr. 7, 2026

(54) THREE-DIMENSIONAL (3D) FACIAL FEATURE TRACKING FOR AUTOSTEREOSCOPIC TELEPRESENCE SYSTEMS

(71) Applicant: Google LLC, Mountain View, CA (US)

(72) Inventors: Sascha Haeberling, San Francisco, CA (US); Jason Lawrence, Seattle, WA (US)

(73) Assignee: GOOGLE LLC, Mountain View, CA (US)

( * ) Notice: Subject to any disclaimer, the term of this patent is extended or adjusted under 35 U.S.C. 154(b) by 458 days.

(21) Appl. No.: 18/246,625

(22) PCT Filed: Nov. 30, 2020

(86) PCT No.: PCT/US2020/070831
§ 371 (c)(1),
(2) Date: Mar. 24, 2023

(87) PCT Pub. No.: WO2022/115119
PCT Pub. Date: Jun. 2, 2022

(65) Prior Publication Data
US 2023/0316810 A1      Oct. 5, 2023

(51) Int. Cl.
*G06V 40/16*      (2022.01)
*G06T 15/00*      (2011.01)
*G06V 10/30*      (2022.01)

(52) U.S. Cl.
CPC ............ *G06V 40/174* (2022.01); *G06T 15/00* (2013.01); *G06V 10/30* (2022.01); *G06V 40/171* (2022.01); *G06V 2201/07* (2022.01)

(58) Field of Classification Search
CPC .... G06V 40/174; G06V 10/30; G06V 40/171; G06V 2201/07; G06V 40/167;
(Continued)

(56) References Cited

U.S. PATENT DOCUMENTS 7,653,213 B2      1/2010   Longhurst et al.
8,884,949 B1      11/2014  Lambert et al.
(Continued)

FOREIGN PATENT DOCUMENTS

CA          3038584 A1 * 10/2020   ............. G06F 3/013
CN      109683335 A      4/2019
(Continued)

OTHER PUBLICATIONS

First Office Action (with English translation) for Chinese Application No. 202080106726.7, mailed Sep. 10, 2024, 19 pages.
(Continued)

*Primary Examiner* — Stephen R Koziol
*Assistant Examiner* — Michael Kim Maiden
(74) *Attorney, Agent, or Firm* — Brake Hughes Bellermann LLP

(57)      ABSTRACT

A method including capturing at least one image using a plurality of cameras, identifying a plurality of facial features associated with the at least one image, stabilizing a location of at least one facial feature of the plurality of facial features, converting the location of the at least one facial feature to a three-dimensional (3D) location, predicting a future location of the at least one facial feature, and rendering a 3D image, on a flat panel display, using the future location of the at least one facial feature.

22 Claims, 6 Drawing Sheets

(58) Field of Classification Search

CPC ........ G06T 15/00; H04N 7/147; H04N 7/157; G09G 3/003; G09G 2354/00

See application file for complete search history.

(56) References Cited

U.S. PATENT DOCUMENTS

| | | | |
|---|---|---|---|
| 9,538,167 B2 * | 1/2017 | Welch | G06T 15/04 |
| 10,171,738 B1 * | 1/2019 | Liang | G06V 40/171 |
| 2014/0347262 A1 * | 11/2014 | Paek | G06F 3/147 |
| | | | 345/156 |
| 2019/0228556 A1 | 7/2019 | Wang et al. | |
| 2019/0325633 A1 * | 10/2019 | Miller, IV | G06V 40/18 |
| 2020/0272806 A1 * | 8/2020 | Walker | G06V 40/167 |

FOREIGN PATENT DOCUMENTS

| | | | |
|---|---|---|---|
| EP | 3429195 | A1 | 1/2019 |
| JP | 2012029209 | A | 2/2012 |
| JP | 2015513833 | A | 5/2015 |
| KR | 20150053730 | A | 5/2015 |
| WO | 2014190221 | A1 | 11/2014 |
| WO | 2018049201 | A1 | 3/2018 |

OTHER PUBLICATIONS

Park, et al., "Gaze Point Detection by Computing the 3D Positions and 3D Motion of Face", IEICE Transactions on Information and Systems, Information & Systems Society, vol. E83-D, No. 4, pp. 884-894, Apr. 2000, XP000975708.

Notice of Allowance for Japanese Application No. 2023-532766 (with English translation), mailed Dec. 17, 2024, 6 pages.

Office Action for Japanese Application No. 2023-532766 (with English translation), mailed Jul. 16, 2024, 10 pages.

International Search Report and Written Opinion for PCT Application No. PCT/US2020/070831, mailed on Aug. 3, 2021, 16 pages.

Cech, et al., "A 3D Approach to Facial Landmarks: Detection, Refinement, and Tracking", 2014 22nd International Conference on Pattern Recognition, 2014, pp. 2173-2178.

Laviola, et al., "Double Exponential Smoothing: An Alternative to Kalman Filter-Based Predicitive Tracking", The Eurographics Association, 2003, 8 pages.

Nescher, et al., "Analysis of Short Term Path Prediction of Human Locomotion for Augmented and Virtual Reality Applications", International Conference on Cyberworlds, 2012, pp. 15-22.

Maimone, et al., "Holographic Near-Eye Displays for Virtual and Augmented Reality", ACM Transactions on Graphics, vol. 36, No. 4, Article 85, Jul. 2017, 16 pages.

Perlin, et al., "An Autostereoscopic Display", SIGGRAPH 2000, pp. 319-326.

* cited by examiner

Capture 2D image(s) — S505

Detect face(s) — S510

Identify facial features — S515

Stabilize facial features — S520

Convert 2D features to 3D features — S525

Filter 3D features — S530

Determine virtual camera position — S535

Determine display position — S540

Determine audio position — S545

THREE-DIMENSIONAL (3D) FACIAL FEATURE TRACKING FOR AUTOSTEREOSCOPIC TELEPRESENCE SYSTEMS

CROSS-REFERENCE TO RELATED APPLICATION

This application is a 35 U.S.C. § 371 National Phase Entry Application from PCT/US2020/070831, filed on Nov. 30, 2020, entitled "THREE-DIMENSIONAL (3D) FACIAL FEATURE TRACKING FOR AUTOSTEREOSCOPIC TELEPRESENCE SYSTEMS", the disclosure of which is incorporated herein by reference in its entirety.

FIELD

Embodiments generally relate to methods, devices, and algorithms used in generating content for presentation on a display.

BACKGROUND

Three-dimensional (3D) telepresence systems can rely on 3D pose information for a user's head to determine where to display video and to project audio. The 3D pose information needs to be accurate. For example, some systems can be accurate, but require the user to wear 3D marker balls. Furthermore, these systems are extremely expensive with a hardware footprint that is large. Other systems can use small consumer-grade devices that can be used, for example, for gaming. However, these systems have an accuracy and speed that does not meet the requirements of a 3D telepresence system. There is a need for a 3D pose information system that has a desired accuracy and speed performance that can be used in a 3D telepresence system without the need for wearable (e.g., 3D marker balls, a head mount display, and the like) devices.

SUMMARY

In a general aspect, a device, a system, a non-transitory computer-readable medium (having stored thereon computer executable program code which can be executed on a computer system), and/or a method can perform a process with a method including capturing at least one image using a plurality of cameras, identifying a plurality of facial features associated with the at least one image, stabilizing a location of at least one facial feature of the plurality of facial features, converting the location of the at least one facial feature to a three-dimensional (3D) location, predicting a future location of the at least one facial feature, and rendering a 3D image, on a flat panel display, using the future location of the at least one facial feature.

Implementations can include one or more of the following features. For example, the at least one image can include two or more images, and the two or more images can be captured at least one of sequentially by the same camera and at the same time by two or more cameras. The identifying a plurality of facial features can include identifying a face associated with the at least one image, generating a plurality of landmarks corresponding to the plurality of facial features on the face, and associating a location with each of the plurality of landmarks. The identifying a plurality of facial features can include identifying a first face associated with the at least one image, identifying a second face associated with the at least one image, generating a first plurality of landmarks corresponding to the plurality of facial features on the first face, generating a second plurality of landmarks corresponding to the plurality of facial features on the second face, associating a first location with each of the first plurality of landmarks, and associating a second location with each of the second plurality of landmarks.

The stabilizing of the location of the at least one facial feature can include selecting a facial feature from at least two of the at least one image, selecting at least two landmarks associated with the facial feature, and averaging the location of the at least two landmarks. The location of the at least one facial feature can include generating a plurality of landmarks corresponding to the plurality of facial features, selecting a subset of the plurality of landmarks, determining a motion of a face based on a velocity associated with the location of each landmark of the subset of the plurality of landmarks, and the stabilizing of the location of the at least one facial feature is based on the motion of the face. The converting of the location of the at least one facial feature to a 3D location can include triangulating the location of the at least one facial feature based on location data generated using images captured by three or more of the plurality of cameras.

The method can further include applying a double exponential filter to the 3D location of the at least one facial feature to reduce a noise associated with the 3D location of the at least one facial feature. The predicting of the future location of the at least one facial feature can include applying a double exponential filter to a sequence of the 3D location of the at least one facial feature, and selecting a value at a time greater than zero (0) that is based on the double exponential filtered sequence of the 3D location before the time zero (0). The method can further include generating audio using the future location of the at least one facial feature.

In a general aspect, a device, a system, a non-transitory computer-readable medium (having stored thereon computer executable program code which can be executed on a computer system), and/or a method can perform a process with a device including a memory including code segments representing a plurality of computer instructions, and a processor configured to execute the code segments, the computer instructions including capturing at least one image using a plurality of cameras, identifying a plurality of facial features associated with the at least one image, stabilizing a location of at least one facial feature of the plurality of facial features, converting the location of the at least one facial feature to a three-dimensional (3D) location, predicting a future location of the at least one facial feature, and rendering a 3D image, on a flat panel display, using the future location of the at least one facial feature.

Implementations can include one or more of the following features. For example, the at least one image can include two or more images, and the two or more images can be captured at least one of sequentially by the same camera and at the same time by two or more cameras. The identifying a plurality of facial features can include identifying a face associated with the at least one image, generating a plurality of landmarks corresponding to the plurality of facial features on the face, and associating a location with each of the plurality of landmarks. The identifying a plurality of facial features can include identifying a first face associated with the at least one image, identifying a second face associated with the at least one image, generating a first plurality of landmarks corresponding to the plurality of facial features on the first face, generating a second plurality of landmarks corresponding to the plurality of facial features on the second face, associating a first location with each of the first plurality of landmarks, and associating a second location with each of the second plurality of landmarks.

The stabilizing of the location of the at least one facial feature can include selecting a facial feature from at least two of the at least one image, selecting at least two landmarks associated with the facial feature, and averaging the location of the at least two landmarks. The stabilizing of the location of the at least one facial feature can include generating a plurality of landmarks corresponding to the plurality of facial features, selecting a subset of the plurality of landmarks, determining a motion of a face based on a velocity associated with the location of each landmark of the subset of the plurality of landmarks, and the stabilizing of the location of the at least one facial feature is based on the motion of the face. The converting of the location of the at least one facial feature to a 3D location can include triangulating the location of the at least one facial feature based on location data generated using images captured by three or more of the plurality of cameras.

The computer instructions can further include applying a double exponential filter to the 3D location of the at least one facial feature to reduce a noise associated with the 3D location of the at least one facial feature. The predicting of the future location of the at least one facial feature can include applying a double exponential filter to a sequence of the 3D location of the at least one facial feature, and selecting a value at a time greater than zero (0) that is based on the double exponential filtered sequence of the 3D location before the time zero (0). The computer instructions can further include generating audio using the future location of the at least one facial feature.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

Figure 1:
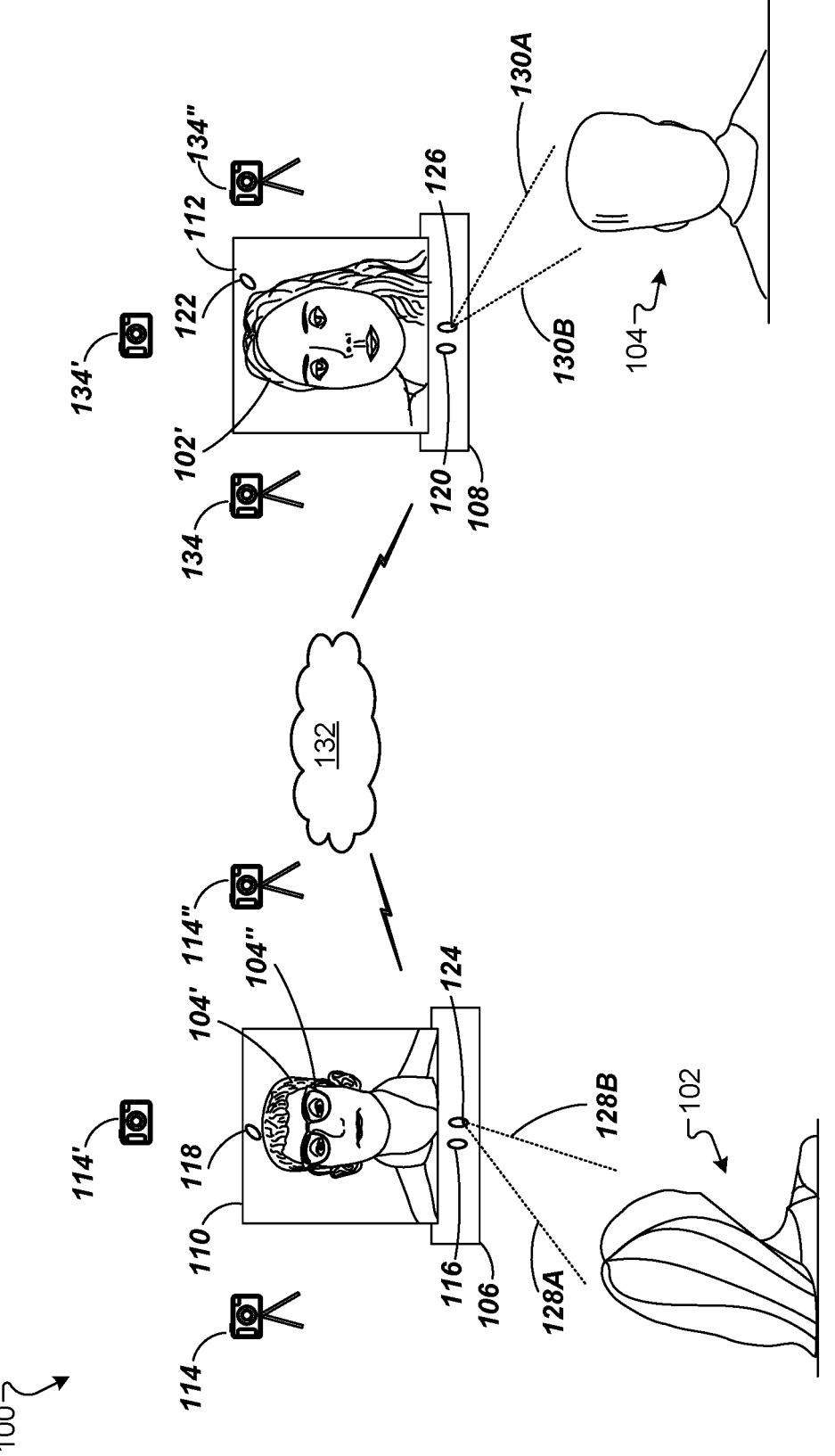
FIG. 1 is a block diagram illustrating an example 3D content system for displaying content on a display device, according to at least one example implementation.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment and should not be interpreted as defining or limiting the range of values or properties encompassed by example embodiments. For example, the relative thicknesses and positioning of molecules, layers, regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

Augmented reality and virtual reality (AR/VR) systems that do not use wearable devices (e.g., head mounted displays (HMDs)), for example, auto-stereoscopic/no-glasses telepresence systems that use a stationary 3D display, may rely on having an accurate up-to-date 3D pose of the user's facial features (e.g., eyes and ears). For example, in these systems (e.g., 3D telepresence systems), accurate eye tracking can be used to modify the displayed scene by positioning a virtual camera and projecting separate left and right stereo images to the left and right eye respectively. Such systems may also use ear tracking to process audio output and input accurately to achieve spatial audio without headphones. Instead, these systems can use, for example, a stationary speaker pair.

In 3D telepresence systems facial feature tracking systems should be, at least, fast, low latency, low noise and jitter, marker-less, and the like. As an example, a fast tracking system should be able to update every 8.33 ms on a 120 Hz display system. A low latency tracking system should report a user's position such that the updated rendering on the screen matches the current user position. Otherwise, users may get dizzy and experience severe visual artifacts if the latency is too high. A low noise and jitter tracking system should minimize scene shaking which can result in visual discomfort. A marker-less tracking system should enable a user to participate in a telepresence system without the discomfort of devices attached to the user (e.g., without an undesirable user experience).

Example implementations can include a system to accurately and cost effectively track facial features of a user (e.g., a user of a 3D telepresence system) without using wearable devices (e.g., a HMD, markers, and/or the like). This facial feature tracking system can use at least one camera (e.g., a monochrome camera, an infrared camera, and/or the like) to capture images at regular intervals. The regular intervals can be short (e.g., less than 6 ms, less than 8 ms, less than 10 ms, and the like). The images can be used to locate faces and facial features and generate virtual camera position, display position, audio position and/or the like. The advantage of the tracking system is that a user does not need to wear devices for facial feature tracking (improving a user experience), the tracking system can acquire feature quickly and the tracking system includes software to generate accurate (e.g., minimal noise) position information.

FIG. 1 is a block diagram illustrating an example 3D content system 100 for capturing and displaying content in a stereoscopic display device, according to implementations described throughout this disclosure. The 3D content system 100 can be used by multiple users to, for example, conduct videoconference communications in 3D (e.g., 3D telepresence sessions). In general, the system of FIG. 1 may be used to capture video and/or images of users during a videoconference and use the systems and techniques described herein to generate virtual camera, display, and audio positions. System 100 may benefit from the use of position generating systems and techniques described herein because such techniques can be used to project video and audio content in such a way to improve a video conference. For example, video can be projected to render 3D video based on the position of a viewer and to project audio based on the position of participants in the video conference.

As shown in FIG. 1, the 3D content system 100 is being used by a first user 102 and a second user 104. For example, the users 102 and 104 are using the 3D content system 100 to engage in a 3D telepresence session. In such an example, the 3D content system 100 can allow each of the users 102 and 104 to see a highly realistic and visually congruent representation of the other, thereby facilitating the users to interact in a manner similar to being in the physical presence of each other.

Each user 102, 104 can have a corresponding 3D system. Here, the user 102 has a 3D system 106 and the user 104 has a 3D system 108. The 3D systems 106, 108 can provide functionality relating to 3D content, including, but not limited to: capturing images for 3D display, processing and presenting image information, and processing and presenting audio information. The 3D system 106 and/or 3D system 108 can constitute a collection of sensing devices integrated as one unit. The 3D system 106 and/or 3D system 108 can include some or all components described with reference to FIG. 3.

The 3D systems 106, 108 can include multiple components relating to the capture, processing, transmission, positioning, or reception of 3D information, and/or to the presentation of 3D content. The 3D systems 106, 108 can include one or more cameras for capturing image content for images to be included in a 3D presentation and/or for capturing faces and facial features. Here, the 3D system 106 includes cameras 116 and 118. For example, the camera 116 and/or camera 118 can be disposed essentially within a housing of the 3D system 106, so that an objective or lens of the respective camera 116 and/or 118 captured image content by way of one or more openings in the housing. In some implementations, the camera 116 and/or 118 can be separate from the housing, such as in form of a standalone device (e.g., with a wired and/or wireless connection to the 3D system 106). As shown in FIG. 1, at least one camera 114, 114' and/or 114" are illustrated as being separate from the housing as standalone devices which can be communicatively coupled (e.g., with a wired and/or wireless connection) to the 3D system 106.

In an example implementation, a plurality of cameras can be used to capture at least one image. The plurality of cameras can be used to capture two or more images. For example, two or more images can be captured sequentially by the same camera (e.g., for tracking). Two or more images can be captured at the same time by two or more cameras (e.g., to be used for triangulation).

The cameras 114, 114', 114", 116 and 118 can be positioned and/or oriented so as to capture a sufficiently representative view of a user (e.g., user 102). While the cameras 114, 114', 114", 116 and 118 generally will not obscure the view of the 3D display 110 for the user 102, the placement of the cameras 114, 114', 114", 116 and 118 can be arbitrarily selected. For example, one of the cameras 116, 118 can be positioned somewhere above the face of the user 102 and the other can be positioned somewhere below the face. Cameras 114, 114' and/or 114" can be placed to the left, to the right, and/or above the 3D system 106. For example, one of the cameras 116, 118 can be positioned somewhere to the right of the face of the user 102 and the other can be positioned somewhere to the left of the face. The 3D system 108 can include an analogous way to include cameras 120, 122, 134, 134', and/or 134", for example. Additional cameras are possible. For example, a third camera may be placed near or behind display 110.

The 3D content system 100 can include one or more 2D or 3D displays. Here, a 3D display 110 is provided for the 3D system 106, and a 3D display 112 is provided for the 3D system 108. The 3D displays 110, 112 can use any of multiple types of 3D display technology to provide an autostereoscopic view for the respective viewer (here, the user 102 or user 104, for example). In some implementations, the 3D displays 110, 112 may be a standalone unit (e.g., self-supported or suspended on a wall). In some implementations, the 3D displays 110, 112 can include or have access to wearable technology (e.g., controllers, a head-mounted display, etc.).

In general, 3D displays, such as displays 110, 112 can provide imagery that approximates the 3D optical characteristics of physical objects in the real world without the use of a head-mounted display (HMD) device. In general, the displays described herein include flat panel displays, lenticular lenses (e.g., microlens arrays), and/or parallax barriers to redirect images to a number of different viewing regions associated with the display.

In some implementations, the displays 110, 112 can be a flat panel display including a high-resolution and glasses-free lenticular three-dimensional (3D) display. For example, displays 110, 112 can include a microlens array (not shown) that includes a plurality of lenses (e.g., microlenses) with a glass spacer coupled (e.g., bonded) to the microlenses of the display. The microlenses may be designed such that, from a selected viewing position, a left eye of a user of the display may view a first set of pixels while the right eye of the user may view a second set of pixels (e.g., where the second set of pixels is mutually exclusive to the first set of pixels).

In some example 3D displays, there may be a single location that provides a 3D view of image content (e.g., users, objects, etc.) provided by such displays. A user may be seated in the single location to experience proper parallax, little distortion, and realistic 3D images. If the user moves to a different physical location (or changes a head position or eye gaze position), the image content (e.g., the user, objects worn by the user, and/or other objects) may begin to appear less realistic, 2D, and/or distorted. Therefore, the techniques described herein can enable accurately determining user position (e.g., user eyes) to enable generation of realistic 3D. The systems and techniques described herein may reconfigure the image content projected from the display to ensure that the user can move around, but still experience proper parallax, low rates of distortion, and realistic 3D images in real time. Thus, the systems and techniques described herein provide the advantage of maintaining and providing 3D image content an objects for display to a user regardless of any user movement that occurs while the user is viewing the 3D display.

As shown in FIG. 1, the 3D content system 100 can be connected to one or more networks. Here, a network 132 is connected to the 3D system 106 and to the 3D system 108. The network 132 can be a publicly available network (e.g., the Internet), or a private network, to name just two examples. The network 132 can be wired, or wireless, or a combination of the two. The network 132 can include, or make use of, one or more other devices or systems, including, but not limited to, one or more servers (not shown).

The 3D systems 106, 108 can include face finder/recognition tools. The 3D systems 106, 108 can include facial feature extractor tools. For example, the 3D systems 106, 108 can include machine learned (ML) tools (e.g., software) configured to identify faces in an image and extract facial features and the position (or x, y, z location) of the facial features. The image(s) can be captured using cameras 114, 114', 114", 116 and/or 118 (for 3D system 106) and using cameras 120, 122, 134, 134', and/or 134" (for 3D system 108).

The 3D systems 106, 108 can include one or more depth sensors to capture depth data to be used in a 3D presentation. Such depth sensors can be considered part of a depth capturing component in the 3D content system 100 to be used for characterizing the scenes captured by the 3D systems 106 and/or 108 in order to correctly represent the scenes on a 3D display. In addition, the system can track the position and orientation of the viewer's head, so that the 3D presentation can be rendered with the appearance corresponding to the viewer's current point of view. Here, the 3D system 106 includes a depth sensor 124. In an analogous way, the 3D system 108 can include a depth sensor 126. Any of multiple types of depth sensing or depth capture can be used for generating depth data.

In some implementations, an assisted-stereo depth capture is performed. The scene can be illuminated using dots of lights, and stereo-matching can be performed between two respective cameras, for example. This illumination can be done using waves of a selected wavelength or range of wavelengths. For example, infrared (IR) light can be used. In some implementations, depth sensors may not be utilized when generating views on 2D devices, for example. Depth data can include or be based on any information regarding a scene that reflects the distance between a depth sensor (e.g., the depth sensor 124) and an object in the scene. The depth data reflects, for content in an image corresponding to an object in the scene, the distance (or depth) to the object. For example, the spatial relationship between the camera(s) and the depth sensor can be known and can be used for correlating the images from the camera(s) with signals from the depth sensor to generate depth data for the images.

The images captured by the 3D content system 100 can be processed and thereafter displayed as a 3D presentation. As depicted in the example of FIG. 1, 3D image 104' with object (eyeglasses 104") are presented on the 3D display 110. As such, the user 102 can perceive the 3D image 104' and eyeglasses 104" as a 3D representation of the user 104, who may be remotely located from the user 102. 3D image 102' is presented on the 3D display 112. As such, the user 104 can perceive the 3D image 102' as a 3D representation of the user 102.

The 3D content system 100 can allow participants (e.g., the users 102, 104) to engage in audio communication with each other and/or others. In some implementations, the 3D system 106 includes a speaker and microphone (not shown). For example, the 3D system 108 can similarly include a speaker and a microphone. As such, the 3D content system 100 can allow the users 102 and 104 to engage in a 3D telepresence session with each other and/or others.

Figure 2:
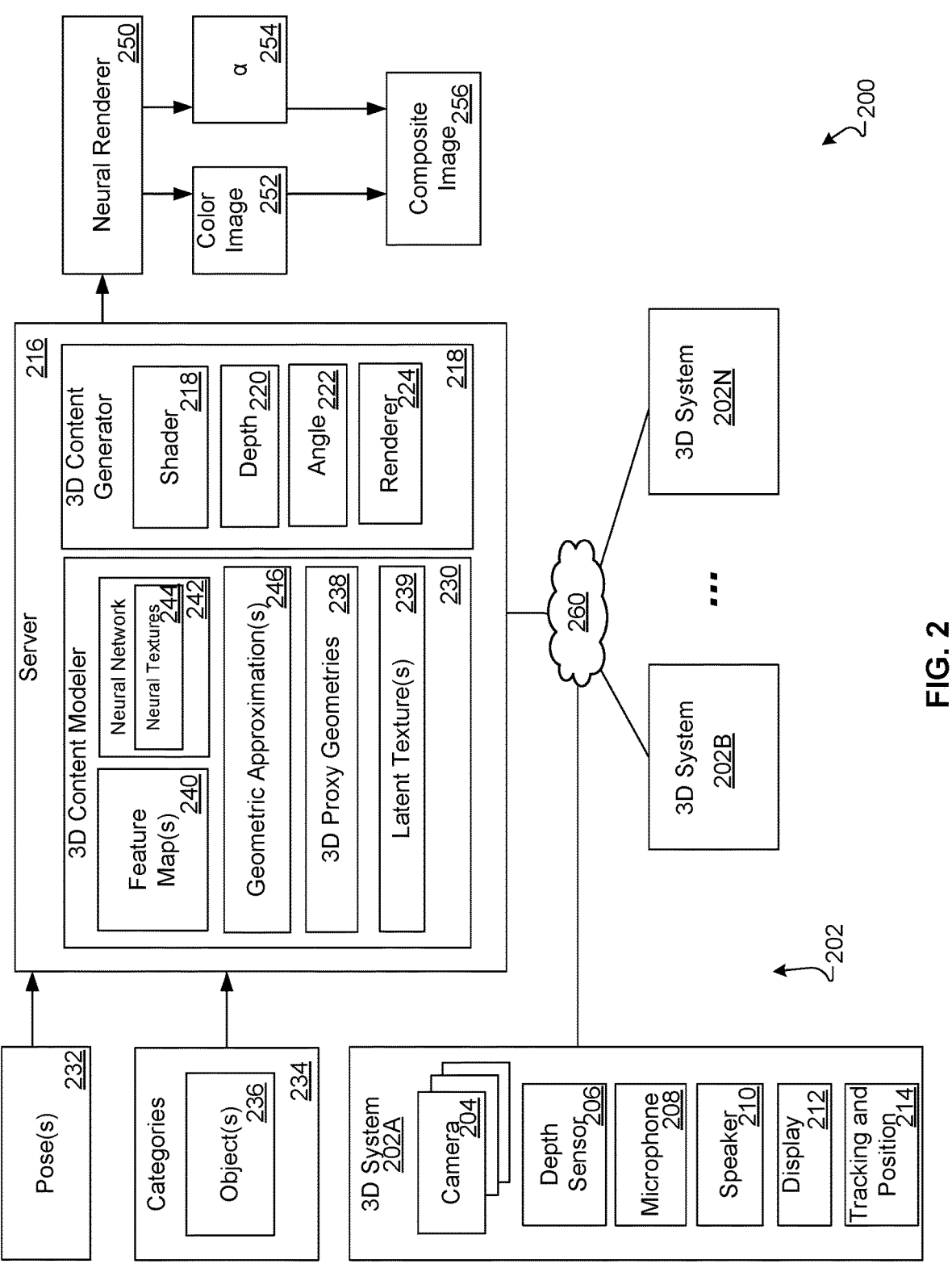
FIG. 2 is a block diagram of an example system for modeling content for render in a display device, according to at least one example implementation.

FIG. 2 is a block diagram of an example system 200 for modeling content for render in a 3D display device, according to implementations described throughout this disclosure. The system 200 can serve as or be included within one or more implementations described herein, and/or can be used to perform the operation(s) of one or more examples of 3D processing, modeling, or presentation described herein. The overall system 200 and/or one or more of its individual components, can be implemented according to one or more examples described herein.

The system 200 includes one or more 3D systems 202. In the depicted example, 3D systems 202A, 202B through 202N are shown, where the index N indicates an arbitrary number. The 3D system 202 can provide for capturing of visual and audio information for a 3D presentation and forward the 3D information for processing. Such 3D information can include images of a scene, depth data about the scene, and audio from the scene. For example, the 3D system 202 can serve as, or be included within, the 3D system 106 and 3D display 110 (FIG. 1).

The system 200 may include multiple cameras, as indicated by cameras 204. Any type of light-sensing technology can be used for capturing images, such as the types of images sensors used in common digital cameras, monochrome cameras, and/or infrared cameras. The cameras 204 can be of the same type or different types. Camera locations may be placed within any location on (or external to) a 3D system such as 3D system 106, for example.

The system 202A includes a depth sensor 206. In some implementations, the depth sensor 206 operates by way of propagating IR signals onto the scene and detecting the responding signals. For example, the depth sensor 206 can generate and/or detect the beams 128A-B and/or 130A-B.

The system 202A also includes at least one microphone 208 and a speaker 210. For example, these can be integrated into a head-mounted display worn by the user. In some implementations, the microphone 208 and speaker 210 may be part of 3D system 106 and may not be part of a head-mounted display.

The system 202 additionally includes a 3D display 212 that can present 3D images in a stereoscopic fashion. In some implementations, the 3D display 212 can be a stand-alone display and in some other implementations the 3D display 212 can be included in a head-mounted display unit configured to be worn by a user to experience a 3D presentation. In some implementations, the 3D display 212 operates using parallax barrier technology. For example, a parallax barrier can include parallel vertical stripes of an essentially non-transparent material (e.g., an opaque film) that are placed between the screen and the viewer. Because of the parallax between the respective eyes of the viewer, different portions of the screen (e.g., different pixels) are viewed by the respective left and right eyes. In some implementations, the 3D display 212 operates using lenticular lenses. For example, alternating rows of lenses can be placed in front of the screen, the rows aiming light from the screen toward the viewer's left and right eyes, respectively.

The system 202A includes a tracking and position 214 block. The tracking and position 214 block can be configured to track a location of the user in a room. In some implementations, the tracking and position 214 block may track a location of the eyes of the user. In some implementations, the tracking and position 214 block may track a location of the head of the user. The tracking and position 214 block can be configured to determine the position of users, microphones, camera's and the like within the system 202. In some implementations, the tracking and position 214 block may be configured to generate virtual positions based on the face and/or facial features of a user. For example, the tracking and position block 214 may be configured to generate a position of a virtual camera based on the face and/or facial features of a user. In some implementations, the tracking and position 214 block can be implemented using cameras 114, 114', 114", 116 and/or 118 (for 3D system 106) and using cameras 120, 122, 134, 134', and/or 134" (for 3D system 108). The tracking and position 214 block may be configured to implement the methods and techniques described in this disclosure within the 3D system(s) 202.

The system 200 can include a server 216 that can perform certain tasks of data processing, data modeling, data coordination, and/or data transmission. The server 216 and/or components thereof can include some or all components described with reference to FIG. 6.

The server 216 includes a 3D content generator 218 that can be responsible for rendering 3D information in one or more ways. This can include receiving 3D content (e.g., from the 3D system 202A), processing the 3D content and/or forwarding the (processed) 3D content to another participant (e.g., to another of the 3D systems 202).

Some aspects of the functions performed by the 3D content generator 218 can be implemented for performance by a shader 218. The shader 218 can be responsible for applying shading regarding certain portions of images, and also performing other services relating to images that have been, or are to be, provided with shading. For example, the shader 218 can be utilized to counteract or hide some artifacts that may otherwise be generated by the 3D system(s) 202.

Shading refers to one or more parameters that define the appearance of image content, including, but not limited to, the color of an object, surface, and/or a polygon in an image. In some implementations, shading can be applied to, or adjusted for, one or more portions of image content to change how those image content portion(s) will appear to a viewer. For example, shading can be applied/adjusted in order to make the image content portion(s) darker, lighter, transparent, etc.

The 3D content generator 218 can include a depth processing component 220. In some implementations, the depth processing component 220 can apply shading (e.g., darker, lighter, transparent, etc.) to image content based on one or more depth values associated with that content and based on one or more received inputs (e.g., content model input).

The 3D content generator 218 can include an angle processing component 222. In some implementations, the angle processing component 222 can apply shading to image content based on that content's orientation (e.g., angle) with respect to a camera capturing the image content. For example, shading can be applied to content that faces away from the camera angle at an angle above a predetermined threshold degree. This can allow the angle processing component 222 to cause brightness to be reduced and faded out as a surface turns away from the camera, to name just one example.

The 3D content generator 218 includes a renderer module 224. The renderer module 224 may render content to one or more 3D system(s) 202. The renderer module 224 may, for example, render an output/composite image which may be displayed in systems 202, for example.

As shown in FIG. 2, the server 216 also includes a 3D content modeler 230 that can be responsible for modeling 3D information in one or more ways. This can include receiving 3D content (e.g., from the 3D system 202A), processing the 3D content and/or forwarding the (processed) 3D content to another participant (e.g., to another of the 3D systems 202). The 3D content modeler 230 may utilize architecture 400 to model objects, as described in further detail below.

Poses 232 may represent a pose associated with captured content (e.g., objects, scenes, etc.). In some implementations, the poses 232 may be detected and/or otherwise determined by a tracking system associated with system 100 and/or 200 (e.g., implemented using cameras 114, 114',

114", 116 and/or 118 (for 3D system 106) and using cameras 120, 122, 134, 134', and/or 134" (for 3D system 108). Such a tracking system may include sensors, cameras, detectors, and/or markers to track a location of all or a portion of a user. In some implementations, the tracking system may track a location of the user in a room. In some implementations, the tracking system may track a location of the eyes of the user. In some implementations, the tracking system may track a location of the head of the user.

In some implementations, the tracking system may track a location of the user (or location of the eyes or head of the user) with respect to a display device 212, for example, in order to display images with proper depth and parallax. In some implementations, a head location associated with the user may be detected and used as a direction for simultaneously projecting images to the user of the display device 212 via the microlenses (not shown), for example.

Categories 234 may represent a classification for particular objects 236. For example, a category 234 may be eyeglasses and an object may be blue eyeglasses, clear eyeglasses, round eyeglasses, etc. Any category and object may be represented by the models described herein. The category 234 may be used as a basis in which to train generative models on objects 236. In some implementations, the category 234 may represent a dataset that can be used to synthetically render a 3D object category under different viewpoints giving access to a set of ground truth poses, color space images, and masks for multiple objects of the same category.

Three-dimensional (3D) proxy geometries 238 represent both a (coarse) geometry approximation of a set of objects and a latent texture 239 of one or more of the objects mapped to the respective object geometry. The coarse geometry and the mapped latent texture 239 may be used to generate images of one or more objects in the category of objects. For example, the systems and techniques described herein can generate an object for 3D telepresence display by rendering the latent texture 239 onto a target viewpoint and accessing a neural rendering network (e.g., a differential deferred rendering neural network) to generate the target image on the display. To learn such a latent texture 239, the systems described herein can learn a low-dimensional latent space of neural textures and a shared deferred neural rendering network. The latent space encompasses all instances of a class of objects and allows for interpolation of instances of the objects, which may enable reconstruction of an instance of the object from few viewpoints.

Neural textures 244 represent learned feature maps 240 which are trained as part of an image capture process. For example, when an object is captured, a neural texture 244 may be generated using the feature map 240 and a 3D proxy geometry 238 for the object. In operation, system 200 may generate and store the neural texture 244 for a particular object (or scene) as a map on top of a 3D proxy geometry 238 for that object. For example, neural textures may be generated based on a latent code associated with each instance of the identified category and a view associated with the pose.

Geometric approximations 246 may represent a shaped-based proxy for an object geometry. Geometric approximations 246 may be mesh-based, shape-based (e.g., triangular, rhomboidal, square, etc.), free form versions of an object.

The neural renderer 250 may generate an intermediate representation of an object and/or scene, for example, that utilizes a neural network to render. Neural textures 244 may be used to jointly learn features on a texture map (e.g., feature map 240) along with a 5-layer U-Net, such as neural network 242 operating with neural renderer 250. The neural renderer 250 may incorporate view dependent effects by modelling the difference between true appearance (e.g., a ground truth) and a diffuse reprojection with an object-specific convolutional network, for example. Such effects may be difficult to predict based on scene knowledge and as such, GAN-based loss functions may be used to render realistic output.

The RGB color channel 252 (e.g., color image) represents three output channels. For example, the three output channels may include (i.e., a red color channel, a green color channel, and a blue color channel (e.g., RGB) representing a color image. In some implementations. In some implementations, the color channel 252 may be a YUV map indicating which colors are to be rendered for a particular image. In some implementations, the color channel 252 may be a CIE map. In some implementations, the color channel 252 may be an ITP map.

Alpha (α) 254 represents an output channel (e.g., a mask) that represents for any number of pixels in the object, how particular pixel colors are to be merged with other pixels when overlaid. In some implementations, the alpha 254 represents a mask that defines a level of transparency (e.g., semi transparency, opacity, etc.) of an object.

The exemplary components above are here described as being implemented in the server 216, which can communicate with one or more of the 3D systems 202 by way of a network 260 (which can be similar or identical to the network 132 in FIG. 1). In some implementations, the 3D content generator 216 and/or the components thereof, can instead or in addition be implemented in some or all of the 3D systems 202. For example, the above-described modeling and/or processing can be performed by the system that originates the 3D information before forwarding the 3D information to one or more receiving systems. As another example, an originating system can forward images, modeling data, depth data and/or corresponding information to one or more receiving systems, which can perform the above-described processing. Combinations of these approaches can be used.

As such, the system 200 is an example of a system that includes cameras (e.g., the cameras 204), a depth sensor (e.g., the depth sensor 206), and a 3D content generator (e.g., the 3D content generator 218) having a processor executing instructions stored in a memory. Such instructions can cause the processor to identify, using depth data included in 3D information (e.g., by way of the depth processing component 220), image content in images of a scene included in the 3D information. The image content can be identified as being associated with a depth value that satisfies a criterion. The processor can generate modified 3D information by applying a model generated by 3D content modeler 230 which may be provided to 3D content generator 218 to properly depict the composite image 256, for example.

The composite image 256 represents a 3D stereoscopic image of a particular object 236 with proper parallax and viewing configuration for both eyes associated with the user accessing a display (e.g., display 212) based at least in part on a tracked location of the head of the user. At least a portion of the composite image 256 may be determined based on output from 3D content modeler 230, for example, using system 200 each time the user moves a head position while viewing the display. In some implementations, the composite image 256 represents the object 236 and other objects, users, or image content within a view capturing the object 236.

In some implementations, processors (not shown) of systems 202 and 216 may include (or communicate with) a graphics processing unit (GPU). In operation, the processors may include (or have access to memory, storage, and other processor (e.g., a CPU)). To facilitate graphics and image generation, the processors may communicate with the GPU to display images on a display device (e.g., display device 212). The CPU and the GPU may be connected through a high-speed bus, such as PCI, AGP or PCI-Express. The GPU may be connected to the display through another high-speed interface such as HDMI, DVI, or Display Port. In general, the GPU may render image content in a pixel form. The display device 212 may receive image content from the GPU and may display the image content on a display screen.

Figure 3:
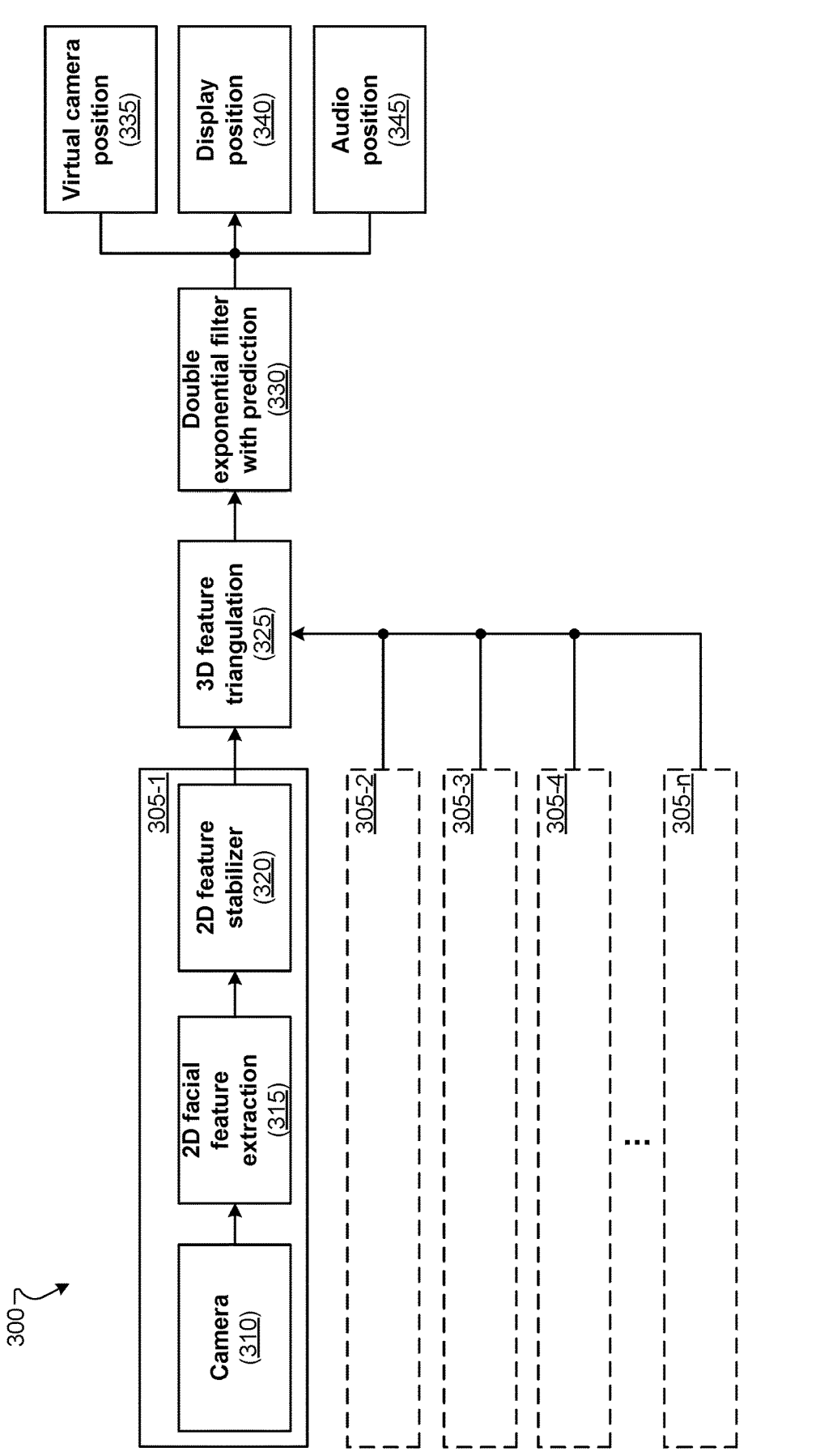
FIG. 3 illustrates a block diagram of a system for tracking facial features and position determining position(s) based on the facial features according to at least one example embodiment.

FIG. 3 illustrates a block diagram of a system for tracking facial features and position determining position(s) based on the facial features according to at least one example embodiment. As shown in FIG. 3 a system 300 includes a feature tracker 305 block, a 3D feature triangulation 325 block, a double exponential filter with prediction 330 block, a virtual camera position 335 block, a display position 340 block, and an audio position 345 block. The feature tracker 305 block includes a camera 310 block, a 2D facial feature extraction 315 block, and a 2D feature stabilizer 320 block. Example implementations can include a plurality of feature trackers (shown as feature tracker 305-1 block, feature tracker 305-2 block, feature tracker 305-3 block, feature tracker 305-4 block, . . . , and feature tracker 305-*n* block). Example implementations can include using at least two (2) feature trackers 305. For example, implementations can use four (4) feature trackers 305 in order to optimize (e.g., increase) accuracy, optimize (e.g., decrease) noise and optimize (e.g., expand) the capture volume as compared to systems using less than four (4) feature trackers 305.

The camera 310 can be a monochrome camera operating at 120 frames per second. When using two or more cameras, the cameras 310 can be connected to a hardware trigger to ensure the cameras 310 fire at the same time. The resulting image frames can be called a frame set, where each frame in the frame set is taken at the same moment in time. The camera 310 can also be an infrared camera having similar operating characteristics as the monochrome camera. The camera 310 an be a combination of monochrome and infrared cameras. The camera 310 can be a fixed camera in a 3D content system (e.g., camera 116, 118, 120, 122). The camera 310 can be a free-standing camera coupled to a 3D content system (e.g., camera 114, 114', 114", 134, 134', 134"). The camera 310 can be a combination of fixed and free-standing cameras. The plurality of cameras can be implemented in a plurality of feature trackers 305.

The 2D facial feature extraction 315 can be configured to extract facial features from an image captured using camera 310. Therefore, the 2D facial feature extraction 315 can be configured to identify a face of a user (e.g., a participant in a 3D telepresence communication) and extract the facial features of the identified face. A face detector (face finder, face locator, and/or the like) can be configured to identify faces in an image. The face detector can be implemented as a function call in a software application. The function call can return the rectangular coordinates of the location of a face. The face detector can be configured to isolate on a single face should there be more than one user in the image.

Facial features can be extracted from the identified face. The facial features can be extracted using a 2D ML algorithm or model. The facial features extractor can be implemented as a function call in a software application. The function call can return the location of facial landmarks (or key points) of a face. The facial landmarks can include eyes, mouth, ears, and/or the like. Face recognition and facial feature extraction can be implemented as a single function call that returns the facial landmarks.

Figure 4:
FIG. 4 pictorially illustrates facial feature positions according to at least one example embodiment.

FIG. 4 pictorially illustrates facial feature positions. In other words, FIG. 4 pictorially illustrates using numbers at landmarks. For example, the numbers 0 and 1 can be the pupils of the left eye and the right eye respectively. The facial feature extractor can output two variables including the landmark number and a pixel number. The pixel number can be based on the resolution (e.g., number of pixels) of the image. For example, the image can have a resolution of 2048×1536 (e.g., a 3-megapixel camera). Therefore, the image can have 3,145,728 pixels with the first pixel in the upper left corner of the image and the last pixel being in the lower right corner of the image.

An example two variable landmark output could be (1, 123456) which can identify the landmark as the right eye pupil being the 123456111 pixel. Pixel position (e.g., 123456) can be mapped to an x-position and a y-position if desired (e.g., to be used for some calculation). The facial feature extractor can output a triple including the landmark number, x-position, and y-position in the image (e.g., a 2048×1526 image) using a 2D coordinate system. For example, the triple (1, 23, 218) can identify the landmark as the right eye pupil having an x-position of 23 and a y-position of 218. These are just two possible examples for locating a position of a facial landmark.

In at least one example implementation, the eyes of the user (e.g., a participant in a 3D telepresence communication) can be a landmark of interest. The eyes can be a landmark of interest because the eyes can indicate the pose of the head of the user. Where the user is looking may not be of interest. Therefore, the pupils (e.g., landmark 0 and landmark 1) may not be used to indicate the pose of the head of the user. However, the eye sockets of the user can be used to indicate the pose of the head of the user. For example, landmarks 402, 414, 406, and 410 can indicate the position of the left eye and landmarks 404, 416, 408 and 412 can indicate the position of the right eye. Each of the landmarks (e.g., 402, 414, 406, and 410) has a location. The multiple locations can be used to create an averaged location (e.g., an eye center). However, other mathematical combinations of landmark locations are possible. For example, landmark location can be weighted, a normal, a mean, interpolated (e.g., interpolation that is or is not the midpoint), and/or the like.

In at least one example implementation, the ears of the user can be a landmark of interest. Therefore, landmark 418 and landmark 420 can be landmarks of interest to indicate the position of the left ear and the right ear respectively.

Returning to FIG. 3, the 2D feature stabilizer 320 can be configured to reduce noise associated with a landmark. For example, a filter can be applied to the 2D feature locations (e.g., landmark locations) in order to stabilize the 2D feature. In an example implementation, the filter can be applied to reduce the noise associated with the location of the eyes (e.g., landmarks 402, 414, 406, 410 and landmarks 404, 416, 408, 412). In at least one example implementation, at least two images are used for feature stabilization.

In an example implementation, stabilizing the eyes (e.g., as a location of a 2D feature) can include determining the center of each eye by averaging location of the landmarks around each eye. Averaging the landmarks around the eyes can reduce noise associated with these landmarks because the noise associated with two or more landmarks may not be correlated.

The stabilizing of the location of the facial feature (e.g., eyes) can be based on the motion of the face. The motion (e.g., velocity) of the face can be used to further reduce the noise. A set of all the facial landmarks can be generated (see FIG. 4) and a subset of facial landmarks that that are substantially stable is determined. For example, particularly noisy landmarks can be excluded. For example, the ears and cheeks can present a high level of noise and inaccuracy. Therefore, the landmarks associated with the ears (e.g., landmark 418 and landmark 420) and cheeks (e.g., landmark 436 and landmark 438) can be excluded in order to generate a substantially stable subset of facial landmarks. Determining the average motion of the face can include calculating the average 2D velocity of the subset of facial landmarks. Considering that the eye sockets are fixed with relation to the rest of the face, the average velocity of the face should be close to that of the eye sockets. Therefore, the velocity of the averaged eye centers and the average velocity of the subset of facial landmarks can be added. The averaged eye centers and the average velocity of the subset of facial landmarks can be added with a preselected set of weights. For example, the facial velocity can be weighted at 90% and the eye center velocity can be weighted at 10%. Stabilized eye features can be based on the original location of the eyes (e.g., landmarks 402, 414, 406, 410 and landmarks 404, 416, 408, 412) and the calculated average velocity.

The 3D feature triangulation 325 can be configured to obtain a 3D position of a landmark. In other words, the 2D location (or position) of the facial feature can be converted to a three-dimensional (3D) location (or position). In an example implementation, the location and orientation (with respect to another camera and/or a display) of the cameras (e.g., cameras 114, 114', 114", 116, 118) and the 3D display (e.g., display 110, 112) is known (e.g., through use of a calibration when setting up the 3D telepresence system). An X and Y coordinate in 2D image space for each camera used to capture an image including a facial feature (e.g., landmark) can be determined. A ray can be generated for each camera landmark pair. For example, a ray that originates at the pixel location of the landmark (e.g., an eye) to each camera can be drawn (e.g., using a function call in software). For four cameras, four rays can be generated. A 3D location of a landmark can be determined based on the rays (e.g., four rays). For example, a location where the rays intersect (or where they approach intersection) can indicate the 3D location of the landmark (e.g., the left eye).

The double exponential filter with prediction 330 can be configured to reduce noise associated with a 3D landmark. The double exponential filter with prediction 330 can also be configured to predict (or used to predict) a future position of a 3D landmark. Although landmark noise was reduced using the 2D feature stabilizer 320, there can be some residual noise associated with a 3D landmark location (or position). The residual noise can be amplified by, for example, environmental conditions or aspects of the user (e.g. glasses, facial hair, and/or the like). The double exponential filter with prediction 330 can be configured to reduce this residual noise.

In an example implementation, a change-band filter can define a band for each axis (x, y and z) from n0 to n1, thus having a width of n1−n0. If the new value is lower than n0, then n0 can be set to the new value and n1 to n0+width. Otherwise, if the new value exceeds n1, then n1 can be set to the new value and n0 is set to n1−width. If the new value is between n0 and n1, nothing will change. The reported actual value can be the center of the band, (n0+n1)/2. The change-band filter may remove jitter. However, the wider the band is the less responsive the signal may be, and the potential error may be higher. Therefore, the band should be as narrow as possible.

In a 3D telepresence system, the tracking-display system can have an inherent latency. The latency can be from the time the photons capturing the user's new position get received by the head tracking cameras to the time the newly calculated position is sent to the renderer and ultimately sent to the display where the pixels of the display change row by row. In some cases, the delay can be approximately 60 milliseconds. Therefore, the user's motion can be used to render the scene by predicting the correct location and to project the stereo images precisely into the user's eyes through the auto-stereo display. The double exponential filter with prediction 330 can include a trend signal used to predict into the future (e.g., to predict a future location of a landmark).

The output of the change-band filter can be the input to a double-exponential filter which further smooth the signal from further noise and predict the signal into the future. The double-exponential filter can be a two times recursive application of an exponential filter. Double exponential smoothing can use a term to account for a trend in the input data (e.g., a series of data). The term can be a slope component that can be updated as a result of the exponential smoothing.

A data sequence of observations (e.g., 3D landmark location or position) can be represented by $x_t$, beginning at time t=0. A smoothing value for time t can be $s_t$ and an estimate of a trend at time t can be $b_t$. An output can be $F_{t+m}$ and an estimate of the value $x_{t+m}$ at time m>0 based on the data up to time t can be:

$$s_0 = x_0,$$

$$b_0 = x_1 - x_0$$

For $t>0$:

$$s_t = \alpha x_t + (1-\alpha)(s_{t-1} + b_{t-1}),$$

$$b_t = \beta(s_t - s_{t-1}) + (1-\beta)b_{t-1}$$

where $\alpha(0 \le \alpha \le 1)$ is the data smoothing factor, and
$\beta(0 \le \beta \le 1)$ is the trend smoothing factor.
Forecasting beyond $x_t$ can be:

$$F_{t+m} = s_t + m \cdot b_t$$

Other algorithms can be used for exponential smoothing (e.g., linear exponential smoothing). In an example implementation, the current value for the location of a landmark (e.g., a facial feature) can be $x_t$ and the value for the future location of the landmark can be predicted as $F_{t+m}$. In other words, predicting a future location of the facial feature (e.g., the landmark) can include selecting a value (e.g., $F_{t+m}$) at a time greater than zero (0) (e.g., at time m>0) that is based on the double exponential filtered sequence of the 3D location before the time zero (0) (e.g., based on the data up to time t).

The virtual camera position 335, the display position 340, and the audio position 345 can use the current value for the location and/or the value for the future location of the landmark as data for the tracking process as a binary that can be used for driving the display, as input to a renderer for presenting the virtual scene (e.g., for determining a position for left eye scene and right eye scene), and as a binary that can be used for projecting audio (e.g., for determining stereo balance between the left ear and the right ear).

The above description of FIG. 3 is for identifying and determining the position of a single face. However, example implementations are not limited to identifying and determining the position of a single participant in the communication. In other words, two or more participants can be identified and located. Therefore, example implementations can include identifying and determining the position of two or more faces along with the eyes, ears, and/or mouth of each face for the purpose of driving a 3D display and 3D rendering system and/or driving an audio system.

3D rendering can include rendering a 3D scene from a desired point of view (POV) (e.g., determined as the location of a face) using a 3D image rendering system. For example, the head tracking techniques described herein can be used to determine two POVs (one for the left and right eye) of each user viewing the display. These viewpoints can then become inputs to the 3D rendering system for rendering the scene. In addition, auto-stereo displays may require taking the images meant for the left and right eyes of each user and mapping those to individual screen pixels. The resulting image that is rendered on the LCD panel (e.g., below the lenticular panel) can appear as though many images are interleaved together. The mapping can be determined by the optical properties of the lens (e.g., how pixels map to rays in space along which they are visible). The auto-stereo display can include any auto-stereo display capable of presenting a separate image to a viewer's left and right eye. One such type of display can be achieved by locating a lenticular lens array in front of an LCD panel, offset by a small distance.

Figure 5:
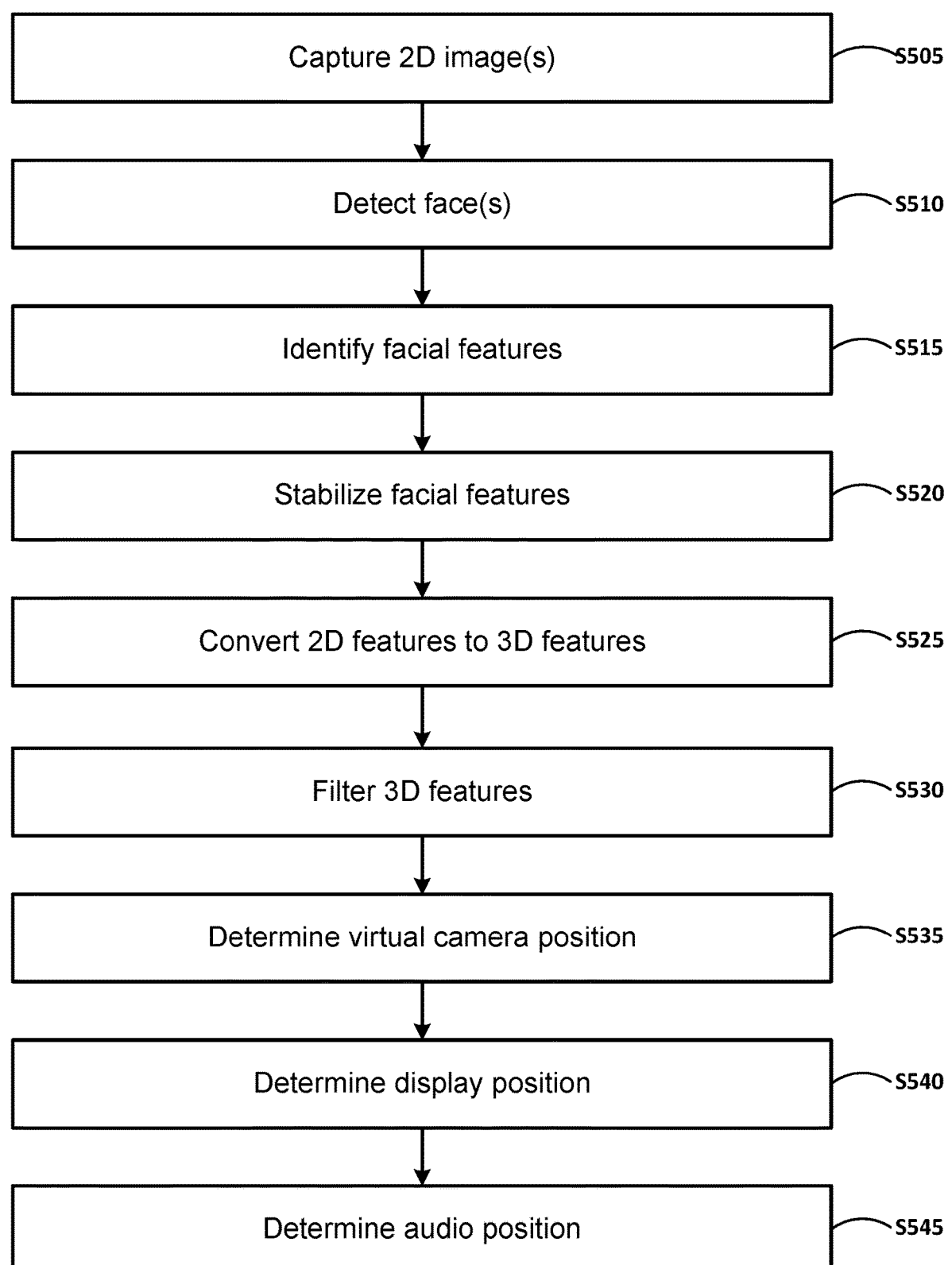
FIG. 5 illustrates a block diagram of a method for tracking facial features and position determining position(s) based on the facial features according to at least one example embodiment.

FIG. 5 illustrates a block diagram of a method according to at least one example embodiment. The steps described with regard to FIG. 5 may be performed due to the execution of software code stored in a memory associated with an apparatus (e.g., as shown in FIGS. 1 and 2) and executed by at least one processor (e.g., at least one processor) associated with the apparatus. However, alternative embodiments are contemplated such as a system embodied as a special purpose processor. Although the steps described below are described as being executed by a processor, the steps are not necessarily executed by the same processor. In other words, at least one processor may execute the steps described below with regards to FIG. 5.

FIG. 5 illustrates a block diagram of a method for tracking facial features and position determining position(s) based on the facial features according to at least one example embodiment. The method for tracking facial features and position determining position(s) based on the facial features can be repeatedly triggered while conducting a 3D telepresence communication (e.g., in a 3D telepresence system). As shown in FIG. 5, in step S505 two-dimensional (2D) image(s) are captured. For example, a plurality of cameras can be used in a 3D telepresence system. Referring to FIG. 1, the image(s) can be captured using cameras 114, 114', 114", 116 and/or 118 (for 3D system 106) and using cameras 120, 122, 134, 134', and/or 134" (for 3D system 108).

In step S510 face(s) are detected. For example, the captured images can be used as input to a face detection algorithm. A face detector (face finder, face locator, and/or the like) algorithm can be configured to identify faces in an image. The face detector algorithm can be implemented as a function call in a software application. The function call can return the rectangular coordinates of the location of a face. The face detector algorithm can be a machine learned algorithm or model. The face detector algorithm can be configured to isolate on a single face should there be more than one user in the image. The face can be associated with a participant in a communication using the 3D telepresence system.

In step S515 facial features are identified. For example, features associated with the detected face(s) can be identified. The facial features can be extracted using a 2D ML algorithm or model. The facial features extractor can be implemented as a function call in a software application. The function call can return the location of facial landmarks (or key points) of a face. The facial landmarks can include eyes, mouth, ears, and/or the like. Face recognition and facial feature extraction can be implemented as a single function call that returns the facial landmarks. Identifying facial features is described above in more detail with regard to FIG. 4.

In step S520 facial features are stabilized. For example, stabilizing facial features can reduce noise associated with a landmark representing a facial feature. For example, a filter can be applied to the 2D feature locations (e.g., landmark locations) in order to stabilize the 2D feature. In an example implementation, the filter can be applied to reduce the noise associated with the location of the eyes (e.g., landmarks 402, 414, 406, 410 and landmarks 404, 416, 408, 412). In at least one example implementation, at least two images are used for feature stabilization.

In an example implementation, stabilizing the eyes (e.g., as a 2D feature) can include determining the center of each eye by averaging the landmarks around each eye. Averaging the landmarks around the eyes can reduce noise associated with these landmarks because the noise associated with two or more landmarks may not be correlated.

A motion (e.g., velocity) of the face can be used to further reduce the noise. Determining motion of the face can include calculating the average 2D velocity of a subset of facial landmarks. Considering that the eye sockets are fixed with relation to the rest of the face, the motion of the face should be close to that of the eye sockets. Therefore, the velocity of the averaged eye centers and the average velocity of the subset of facial landmarks can be added. The averaged eye centers and the average velocity of the subset of facial landmarks can be added with a preselected set of weights. For example, the facial velocity can be weighted at 90% and the eye center velocity can be weighted at 10%. Stabilized eye features can be based on the original location of the eyes (e.g., landmarks 402, 414, 406, 410 and landmarks 404, 416, 408, 412) and the calculated average velocity.

In step S525 2D features are converted to 3D features. For example, 2D facial feature locations can be converted to 3D facial feature locations using a triangulation technique. In an example implementation, the location and orientation (with respect to another camera and/or a display) of the cameras (e.g., cameras 114, 114', 114", 116, 118) and the 3D display (e.g., display 110, 112) is known (e.g., through use of a calibration when setting up the 3D telepresence system). An X and Y coordinate in 2D image space for each camera used to capture an image including a facial feature (e.g. landmark) can be determined. A ray can be generated for each camera landmark pair. For example, a ray that originates at the pixel location of the landmark (e.g., an eye) to each camera can be drawn (e.g., using a function call in software). For four cameras, four rays can be generated. A 3D location of a landmark can be determined based on the rays (e.g., four rays). For example, a location where the rays intersect (or where they approach intersection) can indicate the 3D location of the landmark (e.g., the left eye).

In step S530 the 3D features are filtered. For example, as described in more detail above, a double exponential filter can be used to reduce noise associated with a 3D landmark. The double exponential filter with prediction 330 can also be configured to predict (or used to predict) a future position of a 3D landmark. Although landmark noise was reduced using the 2D feature stabilizer 320, there can be some residual noise associated with a 3D landmark location (or position). The residual noise can be amplified by, for example, environmental conditions or aspects of the user (e.g. glasses, facial hair, and/or the like). The double exponential filter with prediction 330 can be configured to reduce this residual noise and to predict a future location of the 3D landmark.

The camera position, a display position, and an audio position can use the current value for the location and/or the value for the future location of the landmark (e.g., eye position, ear position, and/or the like) as data for the tracking process as a binary that can be used for driving the display, as input to a renderer for presenting the virtual scene (e.g., for determining a position for left eye scene and right eye scene), and as a binary that can be used for projecting audio (e.g., for determining stereo balance between the left ear and the right ear).

Therefore, in step S535 a virtual camera position is determined using the tracking process based on the location of the landmark associated with the eyes. The tracking process can be based on a predicted position of the eyes. In step S540 a display position is determined is determined using the tracking process based on the location of the landmark associated with the eyes. The tracking process can be based on a predicted position of the eyes. In step S545 an audio position is determined is determined using the tracking process based on the location of the landmark associated with the ears. The tracking process can be based on a predicted position of the ears. The landmark position can be a 3D landmark position that has been double exponential filtered and used to predict a future landmark position.

In a general aspect, a device, a system, a non-transitory computer-readable medium (having stored thereon computer executable program code which can be executed on a computer system), and/or a method can perform a process with a method including capturing at least one image using a plurality of cameras, identifying a plurality of facial features associated with the at least one image, stabilizing a location of at least one facial feature of the plurality of facial features, converting the location of the at least one facial feature to a three-dimensional (3D) location, predicting a future location of the at least one facial feature, and rendering a 3D image, on a flat panel display, using the future location of the at least one facial feature.

Implementations can include one or more of the following features. For example, the at least one image can include two or more images, and the two or more images can be captured at least one of sequentially by the same camera and at the same time by two or more cameras. The identifying a plurality of facial features can include identifying a face associated with the at least one image, generating a plurality of landmarks corresponding to the plurality of facial features on the face, and associating a location with each of the plurality of landmarks. The identifying a plurality of facial features can include identifying a first face associated with the at least one image, identifying a second face associated with the at least one image, generating a first plurality of landmarks corresponding to the plurality of facial features on the first face, generating a second plurality of landmarks corresponding to the plurality of facial features on the second face, associating a first location with each of the first plurality of landmarks, and associating a second location with each of the second plurality of landmarks.

The stabilizing of the location of the at least one facial feature can include selecting a facial feature from at least two of the at least one image, selecting at least two landmarks associated with the facial feature, and averaging the location of the at least two landmarks. The location of the at least one facial feature can include generating a plurality of landmarks corresponding to the plurality of facial features, selecting a subset of the plurality of landmarks, determining a motion of a face based on a velocity associated with the location of each landmark of the subset of the plurality of landmarks, and the stabilizing of the location of the at least one facial feature is based on the motion of the face. The converting of the location of the at least one facial feature to a 3D location can include triangulating the location of the at least one facial feature based on location data generated using images captured by three or more of the plurality of cameras.

The method can further include applying a double exponential filter to the 3D location of the at least one facial feature to reduce a noise associated with the 3D location of the at least one facial feature. The predicting of the future location of the at least one facial feature can include applying a double exponential filter to a sequence of the 3D location of the at least one facial feature, and selecting a value at a time greater than zero (0) that is based on the double exponential filtered sequence of the 3D location before the time zero (0). The method can further include generating audio using the future location of the at least one facial feature.

In a general aspect, a device, a system, a non-transitory computer-readable medium (having stored thereon computer executable program code which can be executed on a computer system), and/or a method can perform a process with a device including a memory including code segments representing a plurality of computer instructions, and a processor configured to execute the code segments, the computer instructions including capturing at least one image using a plurality of cameras, identifying a plurality of facial features associated with the at least one image, stabilizing a location of at least one facial feature of the plurality of facial features, converting the location of the at least one facial feature to a three-dimensional (3D) location, predicting a future location of the at least one facial feature, and rendering a 3D image, on a flat panel display, using the future location of the at least one facial feature.

Implementations can include one or more of the following features. For example, the at least one image can include two or more images, and the two or more images can be captured at least one of sequentially by the same camera and at the same time by two or more cameras. The identifying a plurality of facial features can include identifying a face associated with the at least one image, generating a plurality of landmarks corresponding to the plurality of facial features on the face, and associating a location with each of the plurality of landmarks. The identifying a plurality of facial features can include identifying a first face associated with the at least one image, identifying a second face associated with the at least one image, generating a first plurality of landmarks corresponding to the plurality of facial features on the first face, generating a second plurality of landmarks corresponding to the plurality of facial features on the second face, associating a first location with each of the first plurality of landmarks, and associating a second location with each of the second plurality of landmarks.

The stabilizing of the location of the at least one facial feature can include selecting a facial feature from at least two of the at least one image, selecting at least two landmarks associated with the facial feature, and averaging the location of the at least two landmarks. The stabilizing of the location of the at least one facial feature can include generating a plurality of landmarks corresponding to the plurality of facial features, selecting a subset of the plurality of landmarks, determining a motion of a face based on a velocity associated with the location of each landmark of the subset of the plurality of landmarks, and the stabilizing of the location of the at least one facial feature is based on the motion of the face. The converting of the location of the at least one facial feature to a 3D location can include triangulating the location of the at least one facial feature based on location data generated using images captured by three or more of the plurality of cameras.

The computer instructions can further include applying a double exponential filter to the 3D location of the at least one facial feature to reduce a noise associated with the 3D location of the at least one facial feature. The predicting of the future location of the at least one facial feature can include applying a double exponential filter to a sequence of the 3D location of the at least one facial feature, and selecting a value at a time greater than zero (0) that is based on the double exponential filtered sequence of the 3D location before the time zero (0). The computer instructions can further include generating audio using the future location of the at least one facial feature.

Figure 6:
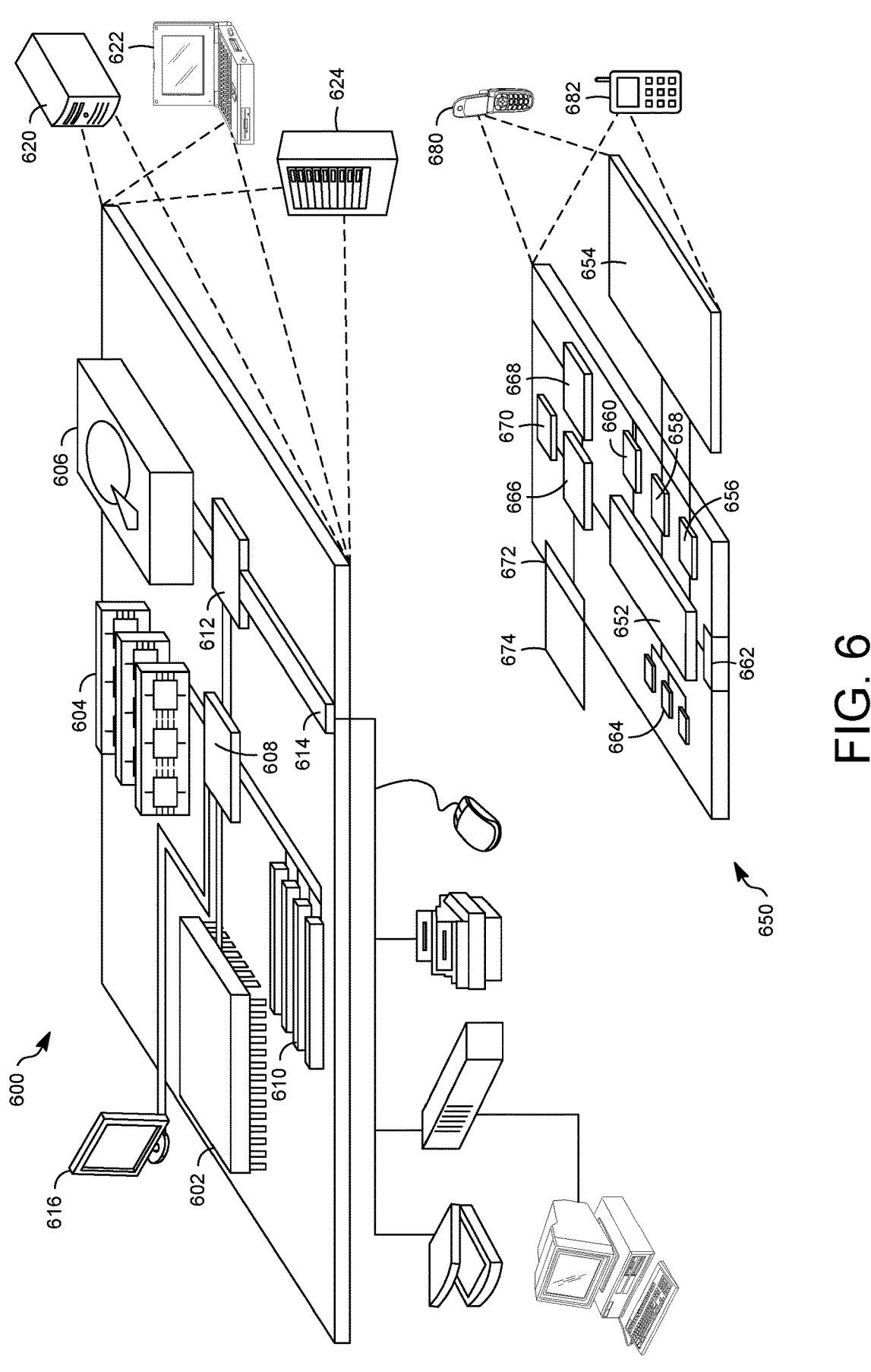
FIG. 6 shows an example of a computer device and a mobile computer device according to at least one example embodiment.

FIG. 6 shows an example of a computer device 600 and a mobile computer device 650, which may be used with the techniques described here. Computing device 600 is intended to represent various forms of digital computers, such as laptops, desktops, workstations, personal digital assistants, servers, blade servers, mainframes, and other appropriate computers. Computing device 650 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 600 includes a processor 602, memory 604, a storage device 606, a high-speed interface 608 connecting to memory 604 and high-speed expansion ports 610, and a low speed interface 612 connecting to low speed bus 614 and storage device 606. Each of the components 602, 604, 606, 608, 610, and 612, are interconnected using various busses, and may be mounted on a common motherboard or in other manners as appropriate. The processor 602 can process instructions for execution within the computing device 600, including instructions stored in the memory 604 or on the storage device 606 to display graphical information for a GUI on an external input/output device, such as display 616 coupled to high speed interface 608. In other implementations, multiple processors and/or multiple buses may be used, as appropriate, along with multiple memories and types of memory. Also, multiple computing devices 600 may be connected, with each device providing portions of the necessary operations (e.g., as a server bank, a group of blade servers, or a multi-processor system).

The memory 604 stores information within the computing device 600. In one implementation, the memory 604 is a volatile memory unit or units. In another implementation, the memory 604 is a non-volatile memory unit or units. The memory 604 may also be another form of computer-readable medium, such as a magnetic or optical disk.

The storage device 606 is capable of providing mass storage for the computing device 600. In one implementation, the storage device 606 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 604, the storage device 606, or memory on processor 602.

The high speed controller 608 manages bandwidth-intensive operations for the computing device 600, while the low speed controller 612 manages lower bandwidth-intensive operations. Such allocation of functions is exemplary only. In one implementation, the high-speed controller 608 is coupled to memory 604, display 616 (e.g., through a graphics processor or accelerator), and to high-speed expansion ports 610, which may accept various expansion cards (not shown). In the implementation, low-speed controller 612 is coupled to storage device 606 and low-speed expansion port 614. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 600 may be implemented in a number of different forms, as shown in the figure. For example, it may be implemented as a standard server 620, or multiple times in a group of such servers. It may also be implemented as part of a rack server system 624. In addition, it may be implemented in a personal computer such as a laptop computer 622. Alternatively, components from computing device 600 may be combined with other components in a mobile device (not shown), such as device 650. Each of such devices may contain one or more of computing device 600, 650, and an entire system may be made up of multiple computing devices 600, 650 communicating with each other.

Computing device 650 includes a processor 652, memory 664, an input/output device such as a display 654, a communication interface 666, and a transceiver 668, among other components. The device 650 may also be provided with a storage device, such as a microdrive or other device, to provide additional storage. Each of the components 650, 652, 664, 654, 666, and 668, are interconnected using various buses, and several of the components may be mounted on a common motherboard or in other manners as appropriate.

The processor 652 can execute instructions within the computing device 650, including instructions stored in the memory 664. The processor may be implemented as a chipset of chips that include separate and multiple analog and digital processors. The processor may provide, for example, for coordination of the other components of the device 650, such as control of user interfaces, applications run by device 650, and wireless communication by device 650.

Processor 652 may communicate with a user through control interface 658 and display interface 656 coupled to a display 654. The display 654 may be, for example, a TFT LCD (Thin-Film-Transistor Liquid Crystal Display) or an OLED (Organic Light Emitting Diode) display, or other appropriate display technology. The display interface 656 may comprise appropriate circuitry for driving the display 654 to present graphical and other information to a user. The control interface 658 may receive commands from a user and convert them for submission to the processor 652. In addition, an external interface 662 may be provide in communication with processor 652, to enable near area communication of device 650 with other devices. External interface 662 may provide, for example, for wired communication in some implementations, or for wireless communication in other implementations, and multiple interfaces may also be used.

The memory 664 stores information within the computing device 650. The memory 664 can be implemented as one or more of a computer-readable medium or media, a volatile memory unit or units, or a non-volatile memory unit or units. Expansion memory 674 may also be provided and connected to device 650 through expansion interface 672, which may include, for example, a SIMM (Single In Line Memory Module) card interface. Such expansion memory 674 may provide extra storage space for device 650 or may also store applications or other information for device 650. Specifically, expansion memory 674 may include instructions to carry out or supplement the processes described above and may include secure information also. Thus, for example, expansion memory 674 may be provide as a security module for device 650 and may be programmed with instructions that permit secure use of device 650. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 664, expansion memory 674, or memory on processor 652, that may be received, for example, over transceiver 668 or external interface 662.

Device 650 may communicate wirelessly through communication interface 666, which may include digital signal processing circuitry where necessary. Communication interface 666 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 668. In addition, short-range communication may occur, such as using a Bluetooth, Wi-Fi, or other such transceiver (not shown). In addition, GPS (Global Positioning System) receiver module 670 may provide additional navigation- and location-related wireless data to device 650, which may be used as appropriate by applications running on device 650.

Device 650 may also communicate audibly using audio codec 660, which may receive spoken information from a user and convert it to usable digital information. Audio codec 660 may likewise generate audible sound for a user, such as through a speaker, e.g., in a handset of device 650. Such sound may include sound from voice telephone calls, may include recorded sound (e.g., voice messages, music files, etc.) and may also include sound generated by applications operating on device 650.

The computing device 650 may be implemented in a number of different forms, as shown in the figure. For example, it may be implemented as a cellular telephone 680. It may also be implemented as part of a smart phone 682, personal digital assistant, or other similar mobile device.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining of displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method comprising:
capturing at least one image using a plurality of cameras;
identifying a plurality of facial features associated with the at least one image;
stabilizing a location of at least one facial feature of the plurality of facial features;
converting the location of the at least one facial feature to a three-dimensional (3D) location;
reducing a noise associated with the 3D location of the at least one facial feature;
predicting a future location of the at least one facial feature; and
rendering a 3D image, on a flat panel display, using the future location of the at least one facial feature.

2. The method of claim 1, wherein
the at least one image includes two or more images, and
the two or more images are captured at least one of sequentially by the same camera and at the same time by two or more cameras.

3. The method of claim 1, wherein the identifying a plurality of facial features includes:
identifying a face associated with the at least one image,
generating a plurality of landmarks corresponding to the plurality of facial features on the face, and
associating a location with each of the plurality of landmarks.

4. The method of claim 1, wherein the identifying a plurality of facial features includes:
identifying a first face associated with the at least one image,
identifying a second face associated with the at least one image,
generating a first plurality of landmarks corresponding to the plurality of facial features on the first face,
generating a second plurality of landmarks corresponding to the plurality of facial features on the second face,
associating a first location with each of the first plurality of landmarks, and associating a second location with each of the second plurality of landmarks.

5. The method of claim 1, wherein the stabilizing of the location of the at least one facial feature includes:
selecting a facial feature from at least two of the at least one image,
selecting at least two landmarks associated with the facial feature, and
averaging the location of the at least two landmarks.

6. The method of claim 1, wherein the stabilizing of the location of the at least one facial feature includes:
generating a plurality of landmarks corresponding to the plurality of facial features,
selecting a subset of the plurality of landmarks,
determining a motion of a face based on a velocity associated with the location of each landmark of the subset of the plurality of landmarks, and
the stabilizing of the location of the at least one facial feature is based on the motion of the face.

7. The method of claim 1, wherein the converting of the location of the at least one facial feature to a 3D location includes:
triangulating the location of the at least one facial feature based on location data generated using images captured by three or more of the plurality of cameras.

8. The method of claim 1, wherein the noise is reduced by applying a double exponential filter to the 3D location of the at least one facial feature.

9. The method of claim 1, wherein the predicting of the future location of the at least one facial feature includes:
applying a double exponential filter to a sequence of the 3D location of the at least one facial feature, and
selecting a value at a time greater than zero (0) that is based on the double exponential filtered sequence of the 3D location before the time zero (0).

10. The method of claim 1, further comprising generating audio using the future location of the at least one facial feature.

11. A three-dimensional (3D) content system comprising:
a memory including code segments representing a plurality of computer instructions; and
a processor configured to execute the code segments, the computer instructions including:
capturing at least one image using a plurality of cameras;
identifying a plurality of facial features associated with the at least one image;
stabilizing a location of at least one facial feature of the plurality of facial features;
converting the location of the at least one facial feature to a three-dimensional (3D) location;
reducing a noise associated with the 3D location of the at least one facial feature;
predicting a future location of the at least one facial feature; and
rendering a 3D image, on a flat panel display, using the future location of the at least one facial feature.

12. The 3D content system of claim 11, wherein
the at least one image includes two or more images, and
the two or more images are captured at least one of sequentially by the same camera and at the same time by two or more cameras.

13. The 3D content system of claim 11, wherein the identifying a plurality of facial features includes:
identifying a face associated with the at least one image,
generating a plurality of landmarks corresponding to the plurality of facial features on the face, and associating a location with each of the plurality of land-marks.

14. The 3D content system of claim 11, wherein the identifying a plurality of facial features includes:

identifying a first face associated with the at least one image, identifying a second face associated with the at least one image, generating a first plurality of landmarks corresponding to the plurality of facial features on the first face, generating a second plurality of landmarks corresponding to the plurality of facial features on the second face, associating a first location with each of the first plurality of landmarks, and associating a second location with each of the second plurality of landmarks.

15. The 3D content system of claim 11, wherein the stabilizing of the location of the at least one facial feature includes:

selecting a facial feature from at least two of the at least one image, selecting at least two landmarks associated with the facial feature, and averaging the location of the at least two landmarks.

16. The 3D content system of claim 11, wherein the stabilizing of the location of the at least one facial feature includes:

generating a plurality of landmarks corresponding to the plurality of facial features, selecting a subset of the plurality of landmarks, determining a motion of a face based on a velocity associated with the location of each landmark of the subset of the plurality of landmarks, and the stabilizing of the location of the at least one facial feature is based on the motion of the face.

17. The 3D content system of claim 11, wherein the converting of the location of the at least one facial feature to a 3D location includes:

triangulating the location of the at least one facial feature based on location data generated using images captured by three or more of the plurality of cameras.

18. The 3D content system of claim 11, wherein the noise is reduced by applying a double exponential filter to the 3D location of the at least one facial feature.

19. The 3D content system of claim 11, wherein the predicting of the future location of the at least one facial feature includes:

applying a double exponential filter to a sequence of the 3D location of the at least one facial feature, and selecting a value at a time greater than zero (0) that is based on the double exponential filtered sequence of the 3D location before the time zero (0).

20. The 3D content system of claim 11, wherein the computer instructions further include generating audio using the future location of the at least one facial feature.

21. A non-transitory computer-readable storage medium having stored thereon computer executable program code which, when executed on a computer system, causes the computer system to perform a method comprising:

capturing at least one image using a plurality of cameras;

identifying a plurality of facial features associated with the at least one image;

stabilizing a location of at least one facial feature of the plurality of facial features;

converting the location of the at least one facial feature to a three-dimensional (3D) location;

applying a double exponential filter to the 3D location of the at least one facial feature to reduce a noise associated with the 3D location of the at least one facial feature;

predicting a future location of the at least one facial feature;

determining a display position for rendering a 3D image, on a flat panel display, using the future location of the at least one facial feature; and determining an audio position for generating audio using the future location of the at least one facial feature.

22. The non-transitory computer-readable storage medium of claim 21, wherein the stabilizing of the location of the at least one facial feature includes:

generating a plurality of landmarks corresponding to the plurality of facial features, selecting a subset of the plurality of landmarks, determining a motion of a face based on a velocity associated with the location of each landmark of the subset of the plurality of landmarks, and the stabilizing of the location of the at least one facial feature is based on the motion of the face.

* * * * *